(12) United States Patent
Foster et al.

(10) Patent No.: US 8,843,787 B1
(45) Date of Patent: Sep. 23, 2014

(54) SYSTEM AND METHOD FOR ARCHIVE VERIFICATION ACCORDING TO POLICIES

(75) Inventors: Michael R. Foster, Pflugerville, TX (US); Jeffrey Ricks Stripling, Austin, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

(21) Appl. No.: 12/861,609

(22) Filed: Aug. 23, 2010

Related U.S. Application Data

(60) Provisional application No. 61/287,124, filed on Dec. 16, 2009.

(51) Int. Cl.
*G06F 11/00* (2006.01)

(52) U.S. Cl.
USPC .............................. 714/42; 709/224; 709/225

(58) Field of Classification Search
USPC .......................................................... 714/42
See application file for complete search history.

(56) References Cited

U.S. PATENT DOCUMENTS

| | | |
|---|---|---|
| 3,704,363 A | 11/1972 | Salmassy et al. |
| 3,984,923 A | 10/1976 | Rawson et al. |
| 4,754,345 A | 6/1988 | Karlstetter |
| 4,932,826 A | 6/1990 | Moy et al. |
| 4,958,235 A | 9/1990 | Sims et al. |
| 5,253,126 A | 10/1993 | Richmond |
| 5,309,768 A | 5/1994 | Mathews et al. |
| 5,386,324 A | 1/1995 | Fry et al. |
| 5,668,800 A | 9/1997 | Stevenson |
| 5,781,703 A | 7/1998 | Desai et al. |
| 5,883,864 A | 3/1999 | Saliba |
| 6,052,264 A | 4/2000 | Curtis |
| 6,052,341 A | 4/2000 | Bingham et al. |
| 6,163,853 A | 12/2000 | Findlay et al. |
| 6,269,330 B1 | 7/2001 | Cidon et al. |
| 6,304,880 B1 | 10/2001 | Kishi |
| 6,490,253 B1 | 12/2002 | Miller et al. |
| 6,624,958 B1 | 9/2003 | Alva |
| 6,715,031 B2 | 3/2004 | Camble et al. |
| 6,725,394 B1 | 4/2004 | Bolt |
| 6,799,156 B1 | 9/2004 | Rieschl et al. |
| 6,823,401 B2 | 11/2004 | Feather, Jr. et al. |
| 6,839,824 B2 | 1/2005 | Camble et al. |

(Continued)

FOREIGN PATENT DOCUMENTS

| | | |
|---|---|---|
| EP | 0726570 | 8/1996 |
| GB | 2419198 | 4/2006 |

OTHER PUBLICATIONS

International Search Report and Written Opinion for International Patent Application No. PCT/US2011/021517, mailed Apr. 19, 2011, 12 pgs.

(Continued)

*Primary Examiner* — Kamini Patel
(74) *Attorney, Agent, or Firm* — Sprinkle IP Law Group

(57) ABSTRACT

Embodiments of systems and methods for archive verification are disclosed. More specifically, embodiments of this archive verification can comprise loading media into a drive and reading data from the media to verify that the media and data on the media can be read. In one embodiment, media can be loaded into a drive and read according to a verification policy. As part of verifying that media and data on media can be read, read errors or other verification data associated with media can be obtained. Using this verification data a result for the media may be determined.

32 Claims, 7 Drawing Sheets

(56) References Cited

U.S. PATENT DOCUMENTS

| | | |
|---|---|---|
| 6,950,871 B1 | 9/2005 | Honma et al. |
| 6,971,046 B1 | 11/2005 | Johnson et al. |
| 7,076,391 B1 | 7/2006 | Pakzad et al. |
| 7,200,546 B1 | 4/2007 | Nourmohamadian et al. |
| 7,200,722 B2 | 4/2007 | Goodman |
| 7,310,745 B2 | 12/2007 | Schnapp et al. |
| 7,386,667 B2 | 6/2008 | Estelle et al. |
| 7,443,801 B2 | 10/2008 | Neidhardt et al. |
| 7,444,469 B2 | 10/2008 | Estelle et al. |
| 7,483,810 B2 * | 1/2009 | Jackson et al. ............... 702/176 |
| 7,492,720 B2 * | 2/2009 | Pruthi et al. .................. 370/252 |
| 7,573,664 B2 | 8/2009 | Bentley et al. |
| 7,583,604 B2 | 9/2009 | Couturier |
| 7,596,096 B2 | 9/2009 | Crawford et al. |
| 7,627,786 B2 | 12/2009 | Bello et al. |
| 7,653,840 B1 | 1/2010 | Taylor et al. |
| 7,809,990 B2 | 10/2010 | Sasaki |
| 7,885,805 B2 | 2/2011 | Dickens et al. |
| 7,908,366 B2 | 3/2011 | Sims |
| 7,971,006 B2 | 6/2011 | Justiss et al. |
| 7,974,215 B1 | 7/2011 | Sims |
| 8,035,911 B2 | 10/2011 | Ballard et al. |
| 8,108,544 B2 * | 1/2012 | Ramakrishnan et al. ..... 709/232 |
| 8,117,501 B2 | 2/2012 | Taniyama et al. |
| 8,145,572 B2 * | 3/2012 | Ito ................................... 705/59 |
| 8,180,824 B2 * | 5/2012 | McCoy et al. ................ 709/201 |
| 8,195,986 B2 | 6/2012 | Meaney et al. |
| 8,631,127 B2 | 1/2014 | Sims |
| 8,631,281 B1 | 1/2014 | Stripling et al. |
| 8,639,807 B2 | 1/2014 | Sims |
| 8,644,185 B2 | 2/2014 | Sims |
| 8,645,328 B2 | 2/2014 | Sims |
| 8,650,241 B2 | 2/2014 | Moody, II et al. |
| 2001/0039579 A1 | 11/2001 | Trcka et al. |
| 2001/0040748 A1 | 11/2001 | Nagai et al. |
| 2002/0006004 A1 | 1/2002 | Mirayama |
| 2002/0055999 A1 | 5/2002 | Takeda |
| 2003/0070053 A1 | 4/2003 | Gallo et al. |
| 2003/0097439 A1 * | 5/2003 | Strayer et al. ................. 709/224 |
| 2003/0126395 A1 | 7/2003 | Camble et al. |
| 2003/0128448 A1 | 7/2003 | Gunderson et al. |
| 2003/0225865 A1 | 12/2003 | Koestler |
| 2003/0233431 A1 | 12/2003 | Reddy et al. |
| 2004/0022263 A1 | 2/2004 | Zhao et al. |
| 2004/0078697 A1 | 4/2004 | Duncan |
| 2004/0139195 A1 | 7/2004 | Feather, Jr. et al. |
| 2004/0139240 A1 | 7/2004 | DiCorpo et al. |
| 2004/0168102 A1 | 8/2004 | Tsunoda |
| 2005/0044451 A1 | 2/2005 | Fry et al. |
| 2005/0052772 A1 | 3/2005 | Barbian et al. |
| 2005/0076263 A1 | 4/2005 | Tomita |
| 2005/0091369 A1 | 4/2005 | Jones |
| 2005/0138195 A1 | 6/2005 | Bono |
| 2005/0149829 A1 | 7/2005 | Lee |
| 2005/0174869 A1 | 8/2005 | Kottomtharayil et al. |
| 2005/0210161 A1 | 9/2005 | Guignard et al. |
| 2005/0231846 A1 | 10/2005 | Winarski et al. |
| 2005/0246376 A1 * | 11/2005 | Lu et al. ...................... 707/104.1 |
| 2005/0246509 A1 | 11/2005 | Topham et al. |
| 2005/0262231 A1 | 11/2005 | Lowe et al. |
| 2006/0085595 A1 | 4/2006 | Slater |
| 2006/0092850 A1 | 5/2006 | Neidhardt et al. |
| 2006/0126211 A1 | 6/2006 | Sasaki |
| 2006/0170238 A1 | 8/2006 | Justiss et al. |
| 2006/0174071 A1 | 8/2006 | Justiss et al. |
| 2006/0190205 A1 * | 8/2006 | Klein et al. ................... 702/115 |
| 2006/0242489 A1 * | 10/2006 | Brockway et al. ............ 714/718 |
| 2007/0025008 A1 * | 2/2007 | Ballard ............................ 360/69 |
| 2007/0079048 A1 | 4/2007 | Starr et al. |
| 2007/0106840 A1 | 5/2007 | Estelle |
| 2007/0226336 A1 | 9/2007 | Katagiri et al. |
| 2007/0253088 A1 | 11/2007 | Clarke et al. |
| 2007/0255920 A1 | 11/2007 | Gold |
| 2007/0294591 A1 * | 12/2007 | Usynin et al. .................. 714/45 |
| 2008/0019283 A1 | 1/2008 | Emile |
| 2008/0098168 A1 | 4/2008 | Estelle |
| 2008/0109547 A1 | 5/2008 | Bao et al. |
| 2008/0115015 A1 | 5/2008 | Ikezawa et al. |
| 2008/0259809 A1 | 10/2008 | Stephan et al. |
| 2008/0282265 A1 | 11/2008 | Foster et al. |
| 2009/0044047 A1 | 2/2009 | Bates et al. |
| 2009/0059757 A1 | 3/2009 | Haustein et al. |
| 2009/0106816 A1 * | 4/2009 | Ito ..................................... 726/1 |
| 2009/0113129 A1 | 4/2009 | Deicke et al. |
| 2009/0198650 A1 | 8/2009 | Sims |
| 2009/0198737 A1 * | 8/2009 | Sims ............................. 707/200 |
| 2009/0199045 A1 | 8/2009 | Kasubuchi et al. |
| 2010/0023604 A1 | 1/2010 | Verma et al. |
| 2010/0033863 A1 | 2/2010 | Fry et al. |
| 2010/0125740 A1 | 5/2010 | Grechanik |
| 2010/0182887 A1 | 7/2010 | Moody et al. |
| 2010/0228805 A1 * | 9/2010 | McCoy et al. ................ 707/966 |
| 2011/0194451 A1 | 8/2011 | Sims |
| 2012/0185589 A1 | 7/2012 | Sims |
| 2012/0221597 A1 | 8/2012 | Sims |
| 2014/0085744 A1 | 3/2014 | Stripling et al. |
| 2014/0095815 A1 | 4/2014 | Sims |
| 2014/0112118 A1 | 4/2014 | Moody, II et al. |
| 2014/0112185 A1 | 4/2014 | Sims |
| 2014/0122438 A1 | 5/2014 | Sims |

OTHER PUBLICATIONS

International Preliminary Report on Patentability (Ch. II) for International Patent Application No. PCT/US08/63227, mailed Oct. 31, 2011, Patent Cooperation Treaty, 25 pgs.

Corrected International Preliminary Report on Patentability (Ch. II) for International Patent Application No. PCT/US08/63227, mailed Feb. 2, 2012, Patent Cooperation Treaty, 22 pgs.

Notice of Allowance for U.S. Appl. No. 12/024,755, mailed Dec. 10, 2010, 16 pgs.

Notice of Allowance for U.S. Appl. No. 13/459,720, mailed May 7, 2013, 2 pages.

Notice of Allowance for U.S. Appl. No. 13/430,429, mailed May 14, 2013, 4 pgs.

Notice of Allowance for U.S. Appl. No. 12/692,403, mailed May 14, 2013, 5 pgs.

Notice of Allowance for U.S. Appl. No. 12/692,403, mailed Aug. 16, 2013, 3 pgs.

Notice of Allowance for U.S. Appl. No. 11/801,809, mailed Aug. 22, 2013, 5 pgs.

Office Action for U.S. Appl. No. 12/888,954, mailed Aug. 23, 2013, 16 pgs.

Notice of Allowance for U.S. Appl. No. 12/861,612, mailed Sep. 30, 2013, 12 pgs.

Notice of Allowance for U.S. Appl. No. 12/025,436, mailed Oct. 4, 2013, 5 pgs.

Notice of Allowance for U.S. Appl. No. 13/091,877, mailed Oct. 8, 2013, 5 pgs.

Notice of Allowance for U.S. Appl. No. 13/430,429, mailed Oct. 30, 2013, 3 pgs.

Notice of Allowance for U.S. Appl. No. 13/459,720, mailed Oct. 30, 2013, 3 pgs.

Notice of Allowance for U.S. Appl. No. 13/430,429, mailed Feb. 11, 2013, 6 pgs.

Notice of Allowance for U.S. Appl. No. 13/459,720, mailed Feb. 11, 2013, 6 pgs.

Office Action for U.S. Appl. No. 12/025,300, mailed Feb. 15, 2013, 35 pgs.

Office Action for U.S. Appl. No. 12/692,403, mailed Feb. 20, 2013, 35 pgs.

IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).

International Preliminary Report on Patentability (Ch. I) for International Patent Application No. PCT/US2011/021517, mailed Aug. 2, 2012, 8 pgs.

Notice of Allowance for U.S. Appl. No. 13/091,877, mailed Feb. 27, 2013, 10 pgs.

(56) References Cited

OTHER PUBLICATIONS

Notice of Allowance for U.S. Appl. No. 12/025,436, mailed Mar. 8, 2013, 10 pgs.
Office Action for U.S. Appl. No. 11/801,809, mailed Mar. 27, 2013, 13 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 11/801,809, mailed Jun. 7, 2011, 16 pgs.
Office Action for U.S. Appl. No. 12/025,436, mailed Mar. 11, 2011, 25 pgs.
Office Action for U.S. Appl. No. 12/025,436, mailed Nov. 9, 2012, 34 pgs.
Office Action for U.S. Appl. No. 12/025,436, mailed Aug. 22, 2011, 36 pgs.
Office Action for U.S. Appl. No. 11/801,809, mailed Dec. 17, 2013, 8 pgs.
Office Action for U.S. Appl. No. 12/025,300, mailed Jan. 2, 2014, 33 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 8 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.
Notice of Allowance for U.S. Appl. No. 11/801,809, mailed Jun. 20, 2013, 4 pgs.
Office Action issued in U.S. Appl. No. 12/025,436, mailed Sep. 15, 2010, 21 pgs.
"SCSI DDS Tape Expert Tool (mstm Online Help)," Hewlett Packard, 2002 http://docs.hp.com/hpux/onlinedocs/diag/stm/help/expert/scsi_ddsm.htm, 8 pages.
Office Action issued in U.S. Appl. No. 11/801,809, mailed Sep. 23, 2010, 31 pgs.
Office Action for U.S. Appl. No. 12/025,300, mailed Jul. 30, 2013, 29 pgs.
Notice of Allowance for U.S. Appl. No. 13/430,429, mailed Aug. 1, 2013, 3 pgs.
Notice of Allowance for U.S. Appl. No. 13/459,720, mailed Aug. 5, 2013, 3 pgs.
Office Action issued in U.S. Appl. No. 12/024,755, mailed Jun. 23, 2010, 11 pgs.
Office Action issued in U.S. Appl. No. 12/025,322, mailed Jul. 8, 2010, 15 pgs.
International Preliminary Report on Patentability (Ch. I) for International Application No. PCT/US2009/032402, issued on Aug. 3, 2010, 7 pgs.
International Preliminary Report on Patentability (Ch. I) for International Application No. PCT/US2009/032390, issued on Aug. 10, 2010, 7 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 13/091,877, mailed Oct. 11, 2012, 14 pgs.
Weber (ed.) Information Technology—SCSI Primary Commands—4 (SPC-4), Project T10/1731-D, rev. 2, Sep. 15, 2005, 499 pgs.
Penokie (ed.) Information Technology—SCSI Block Commands—3 (SBC-3), T10/1799-D, Rev. 6, Jul. 24, 2006, 169 pgs.
Weber (ed.) Information Technology—SCSI Primary Commands—4 (SPC-4), Project T10/1731-D, rev. 10, Apr. 21, 2007, 551 pgs.
Weber (ed.) Information Technology—SCSI Primary Commands—3 (SPC-3), Project T10/1416-D, rev. 22a, Mar. 25, 2005, 496 pgs.
Oetting (ed.) Information Technology—SCSI Media Changer Commands—2 (SMC-2), INCITS T10 Project 1383D, rev. 7, Nov. 18, 2003, 68 pgs.
International Search Report and Written Opinion mailed Aug. 29, 2008 for International Patent Application No. PCT/US2008/63227, 7 pgs.
International Search Report and Written Opinion mailed Jun. 29, 2009 for International Patent Application No. PCT/US2009/032402, 11 pgs.
International Search Report and Written Opinion completed Jun. 26, 2009, mailed Jul. 3, 2009, for International Patent Application No. PCT/US2009/032390, 13 pgs.
Paul Boehler, "Common SCSI/ATAPI Command Set for Streaming Tape" QIC 157, Revision D, Dec. 13, 1995, 50 pgs.
Office Action issued in U.S. Appl. No. 12/025,322, mailed Dec. 30, 2009, 11 pgs.
Office Action issued in U.S. Appl. No. 12/025,436, mailed Mar. 30, 2010, 15 pgs.
Notice of Allowance for U.S. Appl. No. 11/801,809, mailed Mar. 25, 2014, 4 pgs.
Office Action for U.S. Appl. No. 12/025,300, mailed Apr. 23, 2014, 29 pgs.
Office Action for U.S. Appl. No. 14/099,591, mailed Jun. 2, 2014, 13 pgs.
Notice of Allowance for U.S. Appl. No. 11/801,809, mailed Jun. 27, 2014, 4 pgs.
Office Action for U.S. Appl. No. 14/143,046, mailed May 7, 2014, 18 pgs.

* cited by examiner

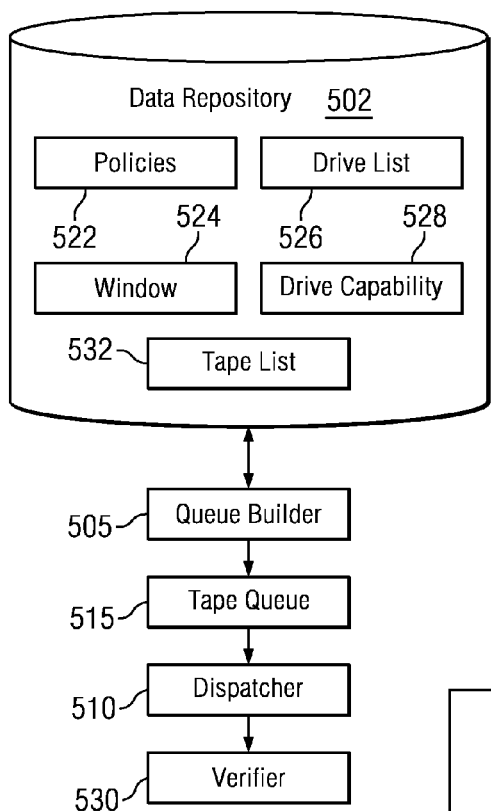
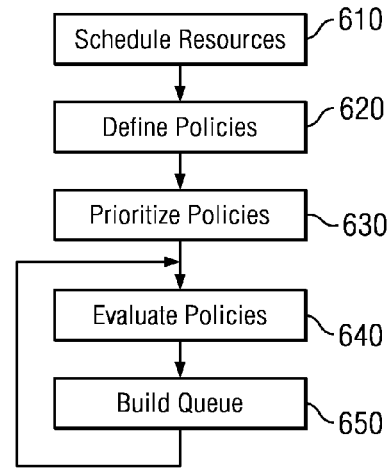
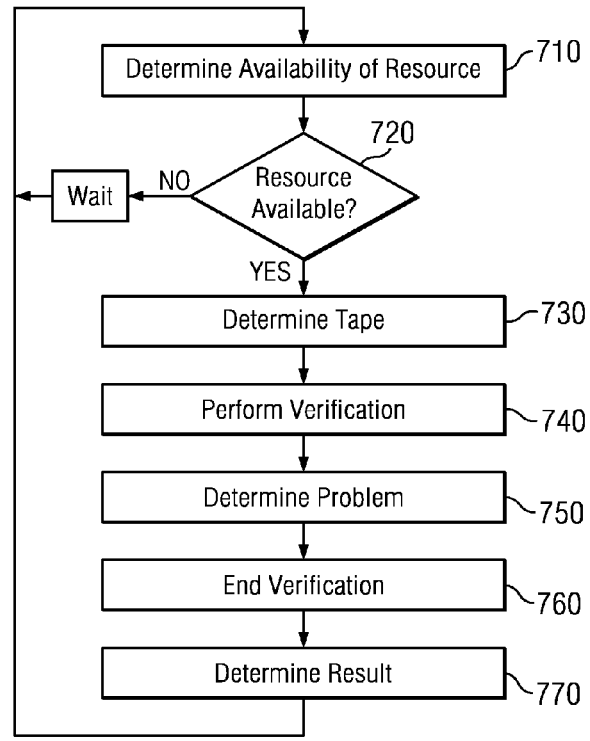
FIG. 5
FIG. 6
FIG. 7

SYSTEM AND METHOD FOR ARCHIVE VERIFICATION ACCORDING TO POLICIES

RELATED APPLICATIONS

This Application claims priority under 35 U.S.C. §119(e) to U.S. Provisional Patent Application No. 61/287,124, entitled "System and Method for Archive Verification According to Policies," filed Dec. 16, 2009, by inventors Michael Foster and Jeffrey Stripling, the contents of which are fully incorporated by reference herein.

TECHNICAL FIELD

This disclosure describes various methods and systems for archive verification. More particularly, embodiments of the disclosure include methods and systems for verifying the readability of library media and data stored on library media according to policies.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage. In one embodiment, the plurality of media may comprise multiple magnetic tapes. Centralized data backup has the advantage of increased volume, efficiency and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation. The degradation of library components can deleteriously affect the reliability of the library. For example, degrading tape cartridges may exhibit an increasing number of soft errors (also known as correctable errors) resulting from corrupted media sections, lost or incorrect data, bit flips, damaged or strained tape sections or other problems or issues. The degradation of a tape cartridge or other media can culminate in the failure of that tape cartridge or media. For example, a tape cartridge or sections of media may be completely unreadable, thus a hard error (also known as an uncorrectable error) or errors may occur.

SUMMARY

Embodiments of systems and methods for archive verification are disclosed. Archive verification allows media in a library to be monitored such that degraded media may be replaced or removed from the library and data on degraded media to be transferred before it is damaged, corrupted or lost. More specifically, embodiments of this archive verification can comprise loading media into a drive (or other device configured to read the media) and reading data from the media to verify that the media and data on the media can be read. In one embodiment, media can be loaded into a drive and read according to a verification policy. As part of verifying that media and data on media can be read, read errors or other verification data associated with media can be obtained. Using this verification data a result for the media may be determined. By verifying library media in this fashion, the degradation and reliability of library media can be monitored, allowing unreliable or unacceptably degraded media to be identified, thus allowing for data on the unreliable or degraded media to be transferred or otherwise backed up and the degraded media replaced, enhancing the reliability of the library and proactively preventing data loss.

Embodiments of such a method of archive verification may include loading a specified media into a drive at intervals, sending one or more commands to the drive in response to which the drive attempts to read the specified media or data on the specified media, collecting data associated with the specified media from the drive and determining a result for the specified media or data on the specified media.

Embodiments of methods and systems for archive verification of media contained in a library can include a system comprising a controller and a set of computer instructions executable by the controller to implement embodiments of methods described herein. In a further embodiment, computer readable media may contain computer instructions operable to implement the above-described method.

Certain embodiments may include a monitoring appliance configured to perform a verification on of media by evaluating a set of verification policies to determine a set of the media, determining that a drive in the library that can read the media is available, verifying a media using the drive, obtaining verification data associated with the verification of the media in the drive and determining a result for the verification of the media based on the verification data.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a diagrammatic representation of one embodiment of a system for performing verification.

FIG. 6 is a flow diagram illustrating one embodiment of a method for use in performing verification.

FIG. 7 is a flow diagram illustrating one embodiment of a method for use in performing verification.

DETAILED DESCRIPTION

Figure 1:
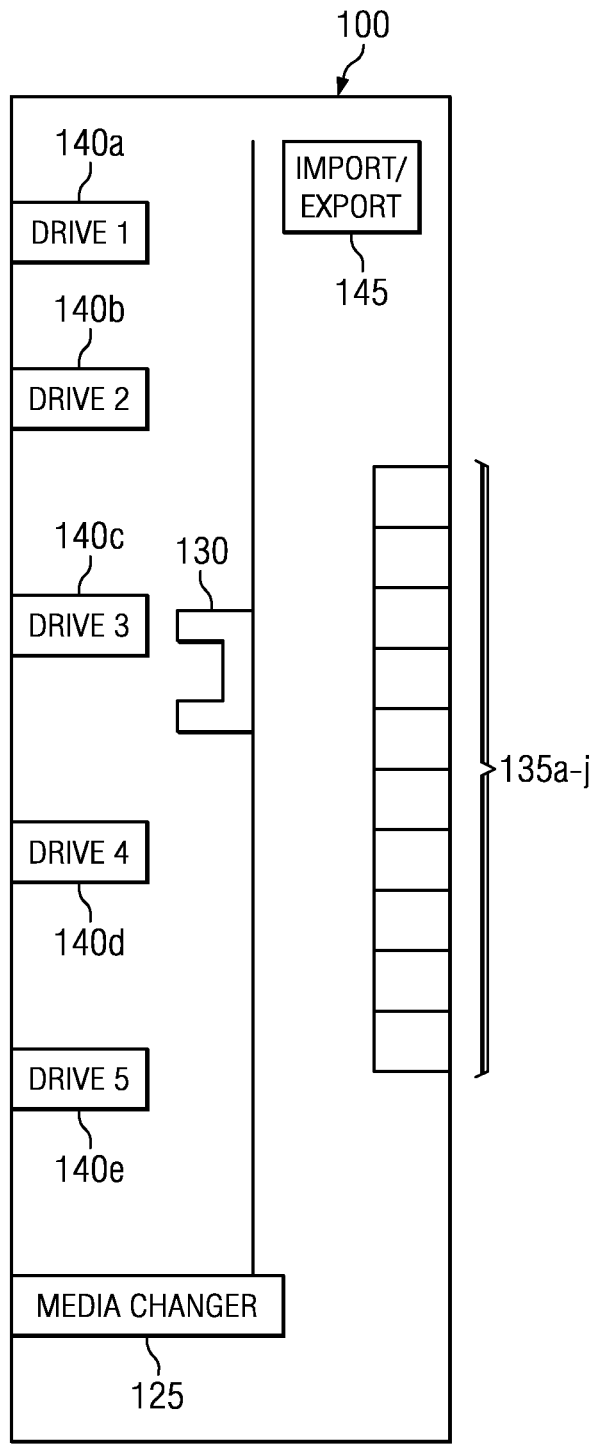
FIG. 1 is a diagrammatic representation of one embodiment of a library.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive, optical disk, RAM, ROM, etc., hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database, which may local or accessed over the network.

ROM, RAM, and HD are computer memories for storing computer-executable instructions executable by the CPU or capable of being compiled or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols. Embodiments can also be implemented with respect to libraries of media other than magnetic tapes. For example, the library can comprise a plurality of optical disks (i.e., an optical jukebox), removable hard drives or other types of media. Other libraries which may be verified according to embodiments of above described systems and methods can utilize a combination of different storage media such as hard drives, magnetic media or optical media.

Before elaborating further on embodiments of the present invention it may be helpful to an understanding of these embodiments to first discuss one embodiment of a tape library. FIG. 1 is a diagrammatic representation of just such an embodiment of a tape library, as would be understood by one of ordinary skill in the art. Library 100 can comprise drives 140*a*-140*e*, media changer 125 and associated robot 130, import/export element(s) 145 and slots 135*a*-135*j*.

Drives 140a-140e can read/write data from/to magnetic tape (contained within cartridges, such cartridges may be referred to herein without loss of generality as tape cartridges, tapes, magnetic tape cartridges, etc.), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be read from the tape cartridge. It should be noted that some libraries may employ a single robot or multiple robots in an expandable or modular configuration.

Library media, such as, for example, backup media such as tape cartridges, backup hard drives or any other media, may contain a flash or other memory in which data may be recorded. This flash memory may be disparate from the memory used as storage for data sent over a network for storage at the library. One term for such flash memory is Medium Auxiliary Memory (MAM) and data stored in MAM may be referred to as MAM data. MAM data for a cartridge may pertain to the cartridge itself, such as the amount of data read from the cartridge, the size of the cartridge, the load count of the cartridge, etc. In general, MAM has three sections: a medium section containing data written by the manufacturer, a device section containing data written by one or more devices, such as, for example, drives, and a host section containing data written by applications such as, for example, backup applications.

The medium section of the MAM may contain data from the manufacturer such as the size of the cartridge, the date of manufacture, compatibility information or other data. The device section of the MAM may contain data from devices which have accessed the cartridge. For example, the device section may contain a load count counter which may be incremented by drives which have loaded the cartridge, read or write error counts, the amount of data read or written, the amount of data contained in the cartridge or other data. The host section of the MAM may contain data from applications, such as, for example, backup or other applications, which have accessed the cartridge, such data may pertain to, for example, the type of backup data stored on the cartridge, the backup date or other data. MAM data may be accessed by a Read Attribute command: in response to a Read Attribute command, a drive or other library device may read MAM data and return MAM data to a requesting device. Examples of a Read Attribute command can be found in "SCSI Primary Commands-4 (SPC-4)", (Project T10/1731-D), Revision 2, 15 Sep. 2005, propagated by the T10 Technical Committee of the InterNational Committee on Information Technology Standards (INCITS), which is hereby incorporated by reference.

As discussed above, components of such a library are subject to wear and other forms of degradation where the degradation of library components can deleteriously affect the reliability of the library. For example, degraded tape cartridges may exhibit an increasing number of soft errors resulting from corrupted media sections, lost or incorrect data, bit flips, damaged or strained tape sections or other problems or issues. The degradation of a tape cartridge or other media can culminate in the failure of that tape cartridge or media resulting in catastrophic consequences for the owners of that data. Accordingly, it is desired to verify media within a library such that degraded media may be replaced or removed from the library and data on degraded media to be transferred before it is damaged, corrupted or lost.

To that end, attention is now directed to the presented embodiments of systems and methods for archive verification. Archive verification allows media in a library to be monitored such that degraded media may be replaced or removed from the library and data on degraded media to be transferred before it is damaged, corrupted or lost. More specifically, embodiments of this archive verification can comprise loading media into a drive (or other device configured to read the media) and reading data from the media to verify that the media and data on the media can be read. In one embodiment, media can be loaded into a drive and read according to a verification policy. As part of verifying that media and data on media can be read, read errors or other verification data associated with media can be obtained. Using this verification data a result for the media may be determined. By verifying library media in this fashion, the degradation and reliability of library media can be monitored, allowing unreliable or unacceptably degraded media to be identified, thus allowing for data on the unreliable or degraded media to be transferred or otherwise backed up and the degraded media replaced, enhancing the reliability of the library and proactively preventing data loss.

In particular, in certain embodiments, to perform archive verification certain commands which are supported by the drives may be used to verify the media. For example, a Verify command is a command which can be used to verify the readability of tape cartridges (or other library media such as laser discs, hard drives or any other media) and data stored on tape cartridges. A verifying device, which may be, for example, an appliance comprising a controller, sends a Verify command to a drive and in response, the drive determines if the cartridge can be read by attempting to read the cartridge. If the drive is able to read the cartridge, the drive returns an indication that the cartridge was successfully read (in one embodiment for example, by returning a command complete to the verifying device). If the drive is unable to read the cartridge, the drive may return an indication that the cartridge could not be read. The inability to read a cartridge or data on a cartridge may be the result of a hard error or the failure of the Verify command. Thus, a Verify command can be used to verify that a particular cartridge in a library can be read. Examples of a Verify command can be found in "SCSI Block Commands-3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

It should be noted here, however, that in some cases, though manufacturers may advertise or state that certain drives are compliant with one or more specification such as those discussed above, these drives may not actually be compliant with such standards and may thus not support the Verify command. Accordingly, a Read command may also be used to verify media. A Read command is a command which can be used to read tape cartridges (or other library media such as laser discs, hard drives or any other media). That is, a requesting device sends a Read command to a drive and in response, the drive reads data stored on the cartridge and the read data is returned to the requesting device. Thus, a Read command can be used to retrieve data from a tape cartridge in a drive. As part of this process of retrieving data, it can be verified that a particular cartridge and data on the particular cartridge can be read. For example, if a Read command is sent to a drive and data from a particular cartridge is successfully read, that particular cartridge and data on that particular cartridge can be read. On the other hand, if that particular cartridge or data from that particular cartridge cannot be read, then the cartridge may have degraded. The inability to read a cartridge or data from a cartridge may be the result of a hard error or a failure of the Read command. Thus, a verifying device can use a Read command to verify the readability of cartridges and data on cartridges. For example, a verifying device can send a Read command to a drive and if data is returned, the readability of the particular cartridge read is verified. On the other hand, if one or more hard errors are returned, or if data cannot be read from that particular cartridge, the particular cartridge may be degraded. Examples of a Read command can also be found in "SCSI Block Commands-3 (SBC-3)", (Project T10/1799-D), Revision 6, 24 Jul. 2006, propagated by the T10 Technical Committee of the InterNational Committee on Information Technology Standards (INCITS).

Other commands may be used to obtain verification data from a drive in which media is being verified. For example, a Log Sense command is a command which is used to obtain data associated with a particular drive. When a Log Sense command is sent to a particular drive of a library the particular drive returns data associated with the drive and cartridges accessed by the drive. For example, such data might include: read errors, write errors, utilization and performance data, data regarding the data written and read to a media, media loaded, detail tables or other data. Examples of a Log Sense command can be found in "SCSI Primary Commands-4 (SPC-4)", (Project T10/1731-D), Revision 10, 21 Apr. 2007, propagated by the T10 Technical Committee of the InterNational Committee on Information Technology Standards (INCITS).

Using commands of the type discussed above then, embodiments of archive verification may be performed according to one or more verification policies. Such a verification policy can specify one or more archive verification parameters such as the duration between verifying cartridges, the acceptable number of read errors or other parameters. At some time interval then, each of the verification policies may be applied to the cartridges within the library to identify cartridges to be verified and (information representing) cartridges which are to be verified may be placed in a queue. When a resource of the library such as a drive, become available to utilize in the verification process a cartridge may be selected from the queue and a verification performed on the cartridge by issuing one or more commends to the library corresponding to the cartridge and drive. The verification data resulting from the verification of the cartridge can then be used to determine a result for the cartridge.

In certain embodiments, archive verification such as that described above may be performed by an archive verification engine. An archive verification engine can be a component of a monitoring appliance which can be a Read Verify Appliance (RVA) or the like. In one embodiment, the archive verification engine is a set of computer instructions which can be executed by a monitoring appliance controller to verify library media. It will be noted that the use of monitoring appliance for performing such archive verification is provided by way of illustration only, more appliances may be utilized, or archive verification functionality may be incorporated with other functionality such as a switch in a network or the like.

Figure 2A:
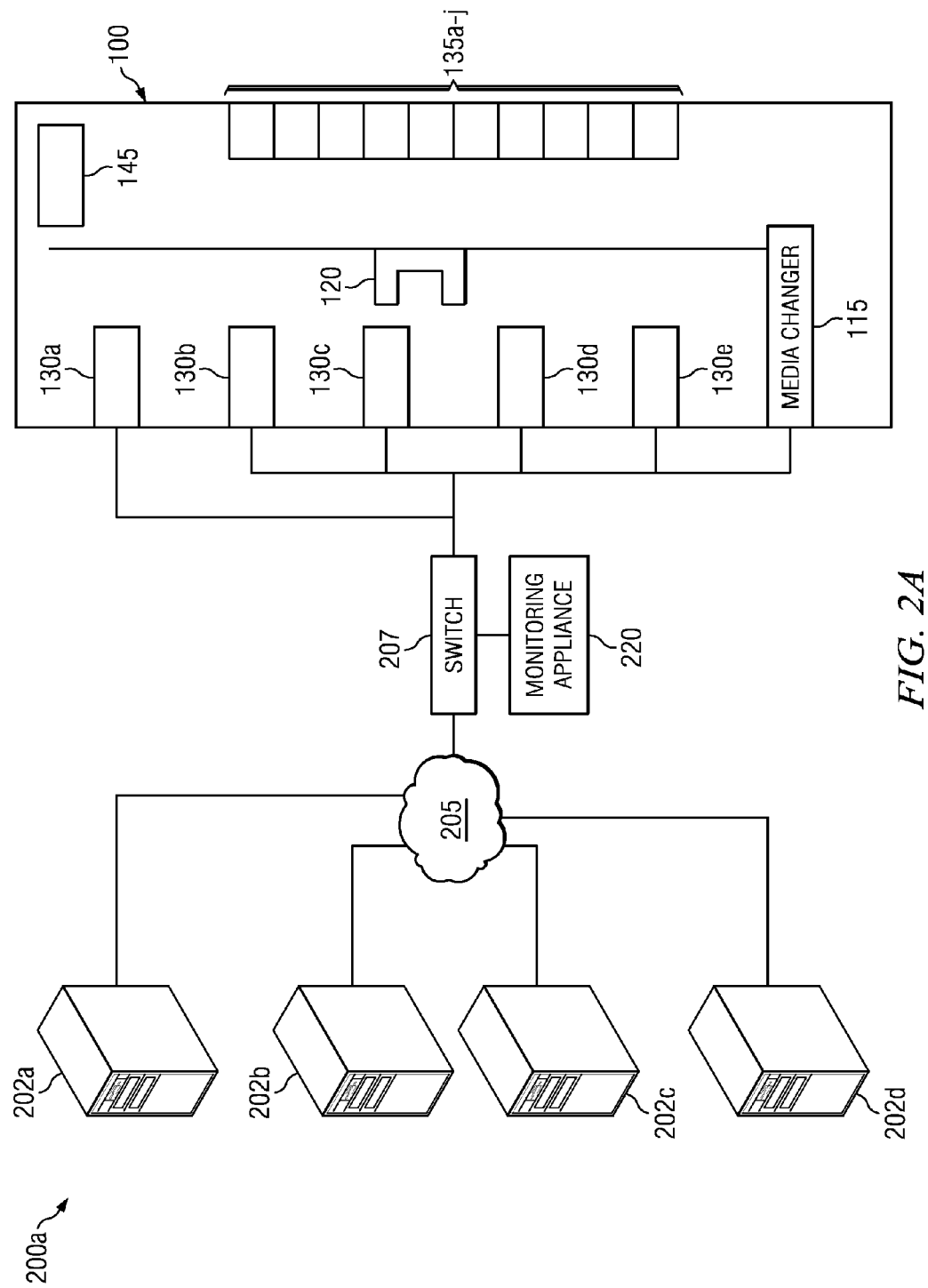
FIGS. 2A-2C are diagrammatic representations of embodiments of a system utilizing a library and having a monitoring appliance.

It may be useful here, however, to illustrate various embodiments of architectures which incorporate monitoring appliance to perform archive verification. FIG. 2A is a diagrammatic representation of a system 200a in which a plurality of hosts 202a-202d have access to library 100 over network 205. Network 205 can comprise the Internet, a SAN, a LAN, a WAN, a wireless network or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Switch 207 is connected to monitoring appliance 220.

Switch 207 is connected to library 100. Thus switch 207 can forward commands, (for example, such as Verify, Read, Log Sense, Read Attribute or other types of commands) from monitoring appliance 220 to library 100. Switch 207 receives the verification data generated in response to the commands from library 100 and forwards the verification data to monitoring appliance 220 which may utilize the verification data or may store the verification data in a repository. By utilizing the verification data to determine a result for a cartridge or by comparing verification data against previous verification data regarding a particular cartridge stored in a repository, monitoring device 220 can monitor the degradation of cartridges. Because monitoring appliance 220 verifies cartridges by sending commands to a library or library devices such as drives or other devices, monitoring appliance 220 does not need to intercept commands or responses from network 205 to verify cartridges. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be coupled to a switch.

Figure 2B:
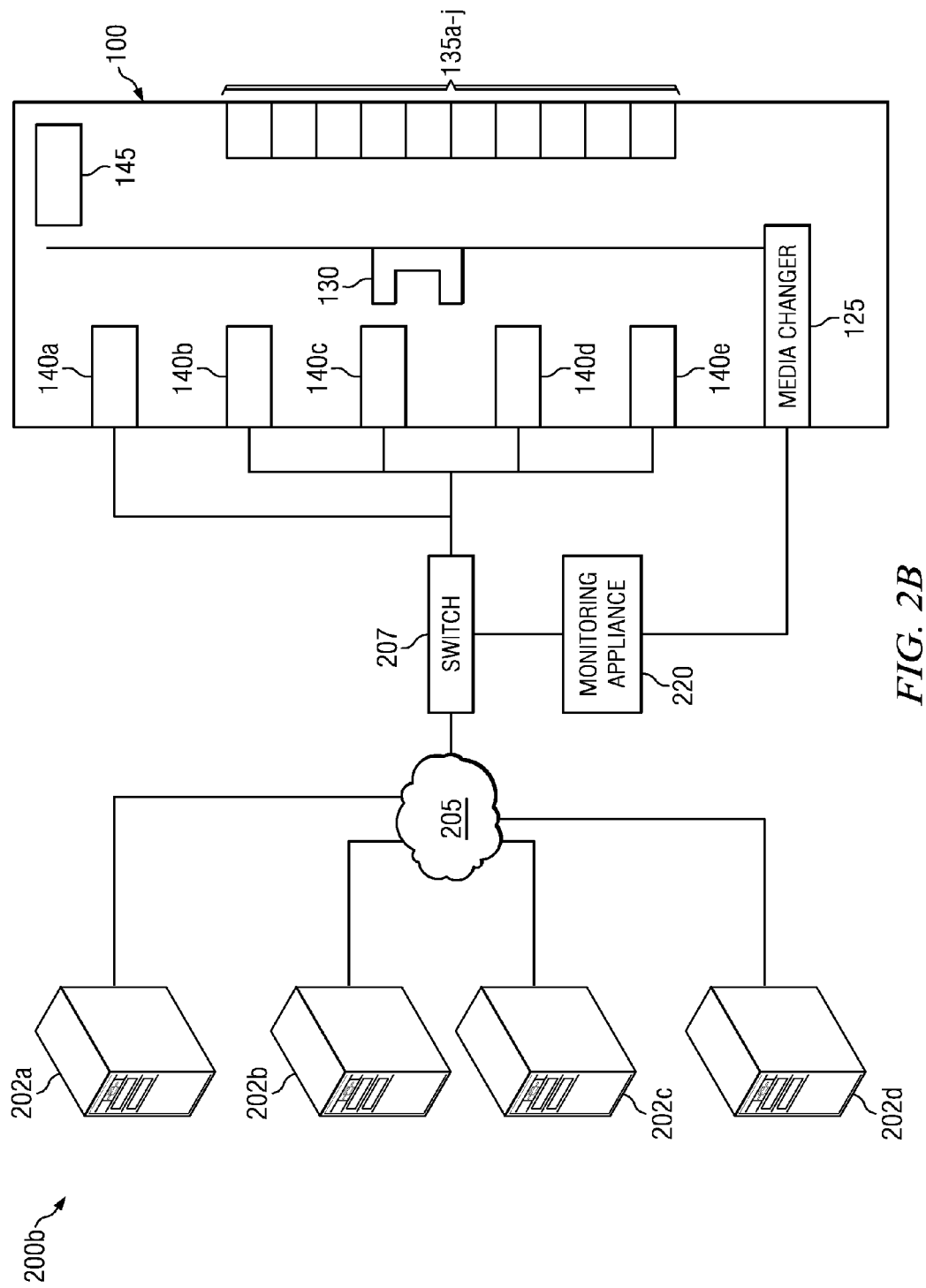
Figure 2C:
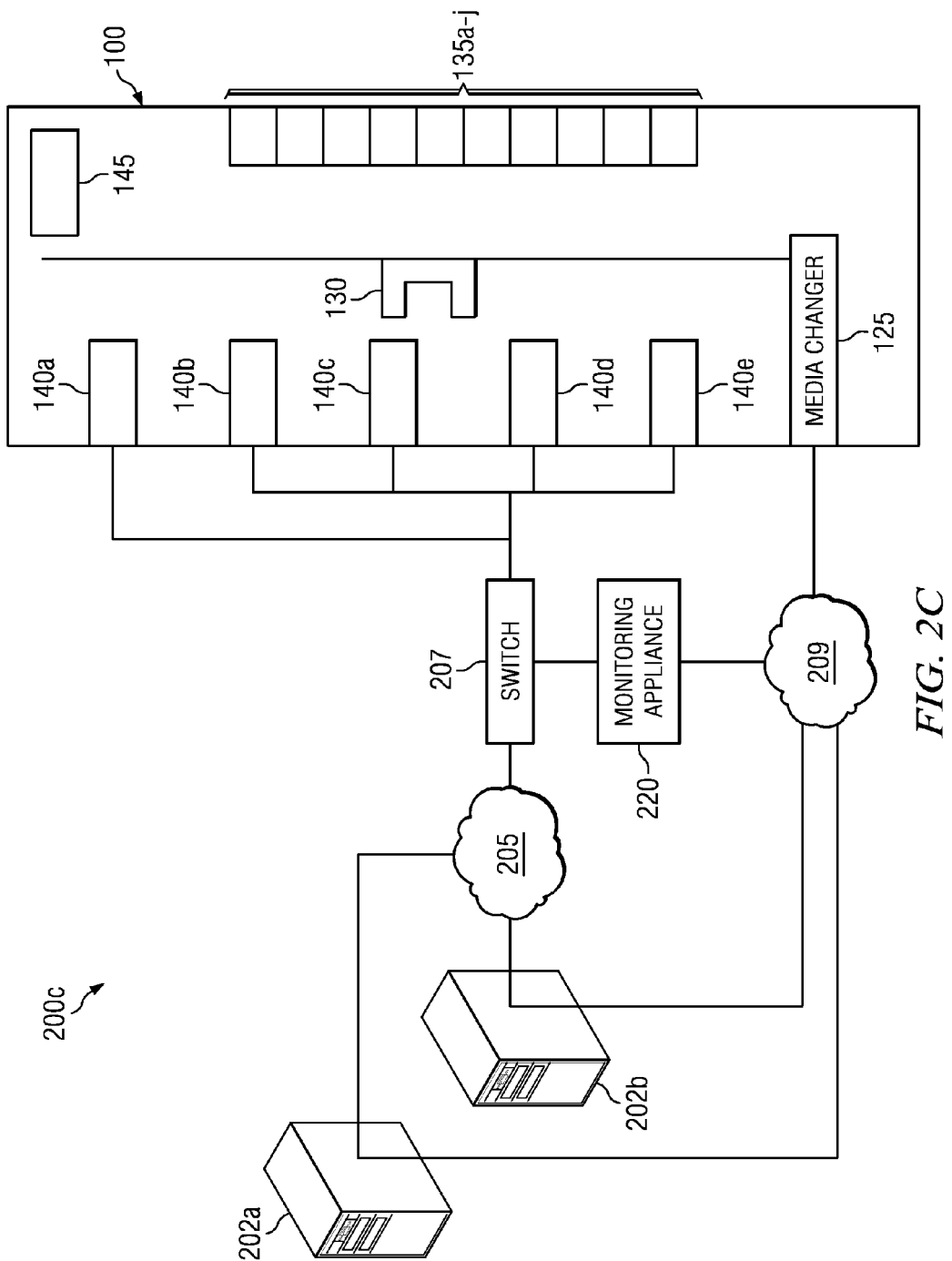

While a particular network topology is shown in FIG. 2A, a monitoring appliance may also be effectively used in other network topologies to collect data associated with a library or library components. FIGS. 2B and 2C are diagrammatic representations of other embodiments of network topologies in which a monitoring appliance can be used to collect data associated with a library or components of the library. Other arrangements will also be possible.

For example, FIG. 2B is a diagrammatic representation of a system 200b having a network topology in which monitoring appliance 220 is coupled to media changer 125 and coupled to drives 140a-140e through switch 207. Thus, monitoring appliance 220 can communicate with (in one embodiment, for example, by sending commands to or receiving data from) media changer 125 and drives 140a-140e. By way of further example, FIG. 2C is a diagrammatic representation of a system 200c having a network topology in which monitoring appliance 220 is coupled to drives 140a-140e through switch 207 and is coupled to media changer 125 through network 209. Thus, monitoring appliance 220 can communicate with media changer 125 and drives 140a-140e. In system 200c, networks 205 and 209 can be different types of networks. For example, network 205 might be a fibre channel network whereas network 209 might be an IP network.

While shown as a physical media library in FIG. 2A-2C, library 100 can be a virtual media library that is a virtual representation of one or more physical media libraries as presented by switch 207, a library controller or other component. Examples of library virtualization are described in U.S. patent application Ser. No. 10/704,265, entitled "SYSTEM AND METHOD FOR CONTROLLING ACCESS TO MULTIPLE PHYSICAL MEDIA LIBRARIES," and U.S. patent application Ser. No. 10/703,965, entitled "SYSTEM AND METHOD FOR CONTROLLING ACCESS TO MEDIA LIBRARIES," both of which are hereby incorporated by reference herein.

Figure 3:
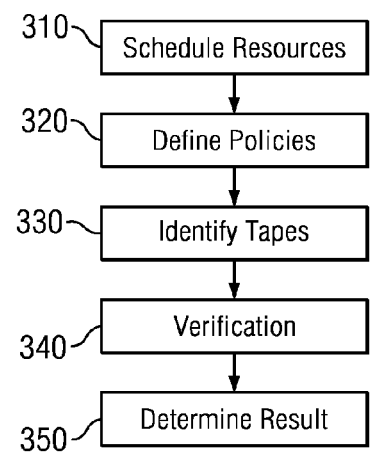
FIG. 3 is a flow diagram illustrating a method for monitoring library components according to one embodiment.

Moving now to FIG. 3, one embodiment of a method for archive verification, (which may for example be performed by a monitoring appliance such as those in FIGS. 2A-2C) is depicted. At step 310 resources may be scheduled for use in the archive verification process. As the media library may undergo verification as described herein while in regular use (for example, while being used for backup or archiving of data, etc.) it may be desired that the archive verification be assigned a lower priority than the regular operations of the library. Accordingly, it may be desired to schedule such verification operations for off-peak or relatively low use time periods, or to dedicate a set of drives for exclusive use by the verification process to allow the remaining drives to continue with the regular operation of the media library. Thus, in some embodiments an administrator may provide a verification window, which may comprise one or more resources (for example, drives) and one or more corresponding time periods for each of those drives. For example, a specific drive of a library may be dedicated to archive verification such that the drive is generally only used for archive verification and is available at all times. In other embodiments, to minimize possible conflicts between archive verification and other operations performed by a library, certain drives may be dedicated to archive verification for periods of time (for example, nightly from 12:00 a.m. to 4:00 a.m.) or a specific drive may be dedicated to archive verification for a number of hours on certain days. In a further embodiment, all the drives in a library may be dedicated to archive verification during a verification window of a specific time period. For example, the verification window may specify that all the drives in a library may be dedicated to archive verification during a defined time period (for example, every month).

Verification policies may then be defined for use in the archive verification process at step 320. These verification policies define one or more criteria which may be used to identify media which should be subjected to verification. These policies may be based on time periods, types of media (for example, types of tape cartridge), how many times the tape has been loaded or read, how many errors have occurred during regular use of the media, or almost any other criteria or combination of criteria desired. Examples of such verification policies are included below, other example will be possible:

Verify each tape that has never been verified.
Verify a tape if the tape has been loaded 25 times since the last verification of the tape.
Verify each tape every 365 days.
Verify each tape that has had a hard error.
Verify a tape if it had more than 10 (soft/hard/total) errors per MB since the tape was last verified.
Verify each tape where the tape was read more than 10 days ago.
Verify each tape that has been written since it was last verified.
Verify a tape if the tape hasn't been verified in [X] days.
Verify each tape all tapes in a particular list/group every 100 days from last verify.
Verify each tape if the tape was loaded more than 15 times since last verify.
Verify each tape if the tape reentered the library >4 times since last verify.

In one embodiment, a user may define such policies using default verification policies or custom user defined verification policies. According to one embodiment, a verification policy template may be made accessible to a user through a user interface at a workstation. For example, a template of "verify if tape had >_____ errors per MB during a session since _____" can allow a user to specify the number of errors and time period. In another embodiment, the template can allow the user to specify the type of error (e.g., "verify if tape had >_____ (soft/hard/total) errors per MB during a session since _____.") In this case, the user can provide the number and type of errors and the time constraint to create a verification policy that will be implemented. The user can create multiple active verification policies having different requirements from the same template. The user can also choose to apply each verify policy to all tapes, an individual tape or a specified group of tapes.

Policies can also be assigned priorities to indicate how verify policies should be processed relative to one another. In one embodiment, tapes identified by a verification policy with a higher priority will be verified first, if possible. In this case, if one policy has a higher priority than another policy all the tapes meeting policy can be ordered before tapes meeting the second policy. According to one embodiment, an "urgent" policy can be implemented that takes priority over all other policies so that all tapes meeting the urgent policy are verified first. In one embodiment for example, a user can add tapes to a list of tapes to be verified immediately. The tapes in this group will be verified before tapes meeting other policies.

These verification policies may be used to identify tapes to be verified at step 330. More specifically, the verification policies may be applied against each of the tapes in a library according to the priority order of the verification policies. In other words, a verification policy with a higher priority may be utilized to identify tapes to be verified before a verification policy with a lower priority. Each tape identified by the application of a verification policy is placed in a list of tapes which are to be verified.

In some cases, it may be possible for a tape to satisfy a verification policy multiple times. For example, if verify policy using a number of errors as a criteria above is used, a tape identified by that policy may be continually identified by the application of that verification policy, even after it has just been verified, if the tape continues to exhibit the requisite number of errors. The same tape may also be identified through the application of multiple different verification policies. Accordingly, rules can be established to notify a user that the tape has been verified a certain number of times overall, a number of times during a defined period or according to another rule configured to alert the user that either the tape may be bad or the verify policy may be too sensitive (i.e., generating too many verifications). As one example, a verification policy can include an exit condition that specifies that if a tape has been verified more that a certain number of times under that policy in a particular time period, the monitoring appliance will send an alert or generate an event so that the user can decide whether to remove the tape. In another embodiment, if a tape has already been placed in the list and is identified by the application of a verification policy, the tape may not be placed in the list again.

Tapes from the list may then be subject to a verification process at step 340. More specifically, resources (such as a drive) of the library may be evaluated to determine if they are available for verification. In one embodiment, this determination can be made according to the verification window (for example, has a resource been designated for verification at this time) and the state of the resource (is it currently being used). If a resource is free and available for verification, the list of tapes is evaluated to determine a tape which can be verified using the resource. In some cases, there may be multiple types of drives and tapes in a library, thus the list of tapes is evaluated to ensure that the tape selected for verification can be loaded and read by the free resource.

To verify a particular tape using a drive in a library, a command is sent to the library to load the tape to be verified in the drive. One or more commands to read the tape may then be sent to the drive. If the drive supports the Verify command, the commands may be Verify commands while if the drive does not support the Verify command the commands may be Read commands. A Read command is used in much the same way that the Verify command is utilized. The drive will, however, return the data read from the cartridge. Receiving read data from a drive serves to confirm that the drive is able to read a cartridge and data on a cartridge. Furthermore, it is possible to compare checksums against the data read to ensure that the read data is correct (which may be done, for example, by the drive). Other data verification algorithms may also be performed on the returned data.

In response to receiving such a command, the library loads the particular tape into that drive and the drive attempts to read data stored on the cartridge. In the course of reading data or attempting to read data on the cartridge, the drive may register read errors. In certain cases, registering read errors increments a read error counter within the drive. Such a read error counter may be a buffer or other memory which is incremented when the drive registers a read error in the course of reading or attempting to read a cartridge. Read errors may be soft errors or hard errors. Soft errors may include those caused by flipped bits, corrupted data, damaged media sectors or other problems or issues; they may be errors that can be corrected by the drive. Read errors may also be hard errors indicating cartridge failure or damaged media sections; they may be errors than can not be corrected by the drive. In one embodiment, the read error counter logs soft errors and hard errors in separate sections in the read error counter.

If the drive is able to read data stored on the cartridge and so verify the readability of the cartridge, the drive returns an indication of a successful verification. Such an indication may be, for example, a command complete message. If, however, the drive is unable to read data stored on the cartridge or the cartridge, the drive may return an indication of a failed verification. The inability to read a cartridge may be the result of a hard error or the failure of a command.

In addition to sending the Verify or Read command to the drive, a Log Sense command may also be sent to the drive in which the particular cartridge was loaded. In response to the Log Sense command, the drive returns data associated with the drive being verified. Such data may include the number of read errors logged by the drive and may also include: utilization and performance data, data pertaining to the data read from the media, detail tables or other data. In one embodiment, data returned in response to a Log Sense command or other command may be used to determine which sections of the media registered soft errors or could not be read by, for example, tracking the count of blocks. In some embodiments, a Read Attribute command may also be issued the drive. In response to the Read Attribute command, the drive returns MAM data from the particular cartridge in the drive.

Data returned in response to a Log Sense or other command (for example, the number of read errors registered by the drive) can be correlated with the cartridge such that the number of read errors (for example, soft errors or hard errors) registered by a drive while reading or attempting to read a particular cartridge can be associated with that particular cartridge. Furthermore, verification data associated with a cartridge may be saved over time. If the verification data for a particular cartridge exhibits an upward trend in read errors over time or if read errors are increasingly prevalent in a particular section of the cartridge a warning may be issued to a user (virtual or otherwise) that the cartridge has degraded such that it is no longer reliable and that data on the cartridge should be transferred before it is corrupted or lost. Alternatively, a data transfer from a cartridge showing decreased reliability to another tape may be automatically initiated.

Based on the verification data (which may be, for example, data used to determine the reliability of media, such as data returned in response to a Verify command, Read command, Log Sense command, Read Attribute command, etc.) returned from the drive, a result for each of the tapes verified can be determined at step 350. The result may be a PASS or a FAIL and may be associated with the tape. The determination of a result for a tape may comprise applying one or more rules to the verification data, where the rules apply criteria to the verification data to assign a result. For example, if one or more hard errors have occurred during the verification process for a tape the tape may be associated with a result of FAIL while if no hard errors have occurred the tape may be associated with a result of PASS. Other results and rules will also be possible. For example, the PASS result may be further divided into results of CAUTION, CONCERN or GOOD, based upon the verification data based on an analysis of the verification data, embodiments of which will be discussed in more detail below.

Figure 4:
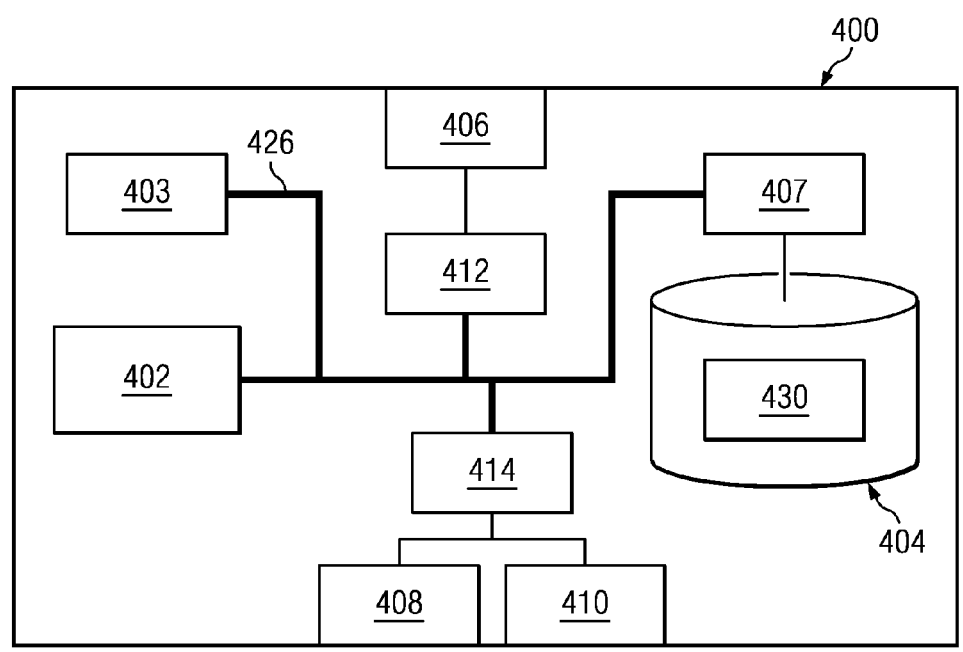
FIG. 4 is a diagrammatic representation of one embodiment of a controller which can be used in a monitoring appliance.

As discussed above, embodiments of the systems and methods discussed herein may be usefully utilized in a monitoring appliance. Embodiments of such a monitoring appliance will now be discussed in more detail. Turning first to FIG. 4, a diagrammatic representation of one embodiment of a monitoring appliance controller 400 ("controller 400") is depicted. Controller 400 can include a processor 402, such as an Intel Pentium 4 based processor (Intel and Pentium are trademarks of Intel Corporation of Santa Clara, Calif.), a primary memory 403 (which, in one embodiment, may comprise RAM, ROM, Flash Memory, EEPROM or other computer readable medium known in the art) and a secondary memory 404 (which, in one embodiment may comprise a hard drive, disk drive, optical drive, database or other computer readable medium known in the art). A memory controller 407 can control access to secondary memory 404. Controller 400 can comprise a communications interface 406 (which, in one embodiment, may comprise a fibre channel interface, Ethernet port or other communications interface known in the art) to connect controller 400 to a switch or other network interface such as, for example, switch 207 of FIGS. 2A-2C. An I/O controller 412 can control interactions with the switch. Similarly, an I/O controller 414 can control interactions over I/O interfaces 408 and 410. Controller 400 can include a variety of input devices. Various components of controller 400 can be connected by a bus 426.

Secondary memory 404 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 404 can store a software program 430 that comprises an archive verification engine. Secondary memory 404 can also store verification policies that may be used with software program 430. Secondary memory 404 can also serve as a repository for verification data which may be saved over time and store other data such as a drive list, a tape list, a verification list, a verification window, etc. During execution by processor 402, portions of program 430 can be stored in secondary memory 404 and/or primary memory 403.

FIG. 5 is a diagrammatic representation of one embodiment of a verification system that may, for example, be implemented in conjunction with a monitoring appliance. According to one embodiment, the system 500 can include a data repository 502, a queue builder 505, dispatcher 510 and a verifier 530. The data repository 502 may comprise data used for, or obtained through, the verification of tapes in a media library. In one embodiment, such data may comprise a prioritized list of verification policies 522 to be utilized in a verification process, a verification window 524 specifying one or more drives of a library and associated times when each of these drives can be used for a verification process, a drive list 526 identifying the drives in the library, where each drive is associated with drive type information (for example, manufacturer, model number, serial number, address, etc.) and a state designating if the drive is available for use in a verification process but in use, available for use in a verification process and not in use, or not available for verification (this state may be determined based on, for example, the verification window 524), a drive capability list 528 which may comprise a list of drive types and each drive type's corresponding functionality (for example, if the drive type supports a Verify command), a tape list 532 that comprises a list of each tape in the library and associated information for the tape, including for example, a type of the tape or a result determined for the tape during the verification process, a last verification date specifying when the last verification was performed on the tape, verification data associated with the tape, etc. Tracking cartridges and maintaining information regarding cartridges is described in U.S. patent application Ser. No. 11/801,809, entitled METHOD AND SYSTEM FOR NON-INTRUSIVE MONITORING OF LIBRARY COMPONENTS and U.S. patent application Ser. No. 12/024,755 entitled MEDIA LIBRARY MONITORING SYSTEM AND METHOD, both of which are hereby incorporated by reference, and verification data obtained during the verification process where the verification data may include such data as the number and type of errors.

Using data in data repository 502, queue builder 505 builds a queue of tapes 515 which are to undergo a verification process. Queue builder 505 can be executed substantially continuously (for example, a background process such as a daemon or the like), or be initiated and terminated as needed or desired. Queue builder 505 can evaluate the verification policies 522 in the order of their priority. Queue builder 505 then evaluates the tapes to determine if the tapes meet each verification policy. Queue builder 505 can utilize data in data repository associated with each tape to determine if the tape meets criteria specified in a verification policy. Thus, for example, if a policy pertaining to the last verification conducted on a tape is being evaluated, queue builder 505 can utilize the last verification dates of all the tapes stored in conjunction with those tapes in, for example, tape list 532.

Once the list of tapes that meet a verification policy are identified, queue builder 505 may flag a tape, add the tape to queue 515 (which may be a table in data repository 502) or otherwise identify tapes to be verified. As a result queue builder 505 can organize the order in which tapes are to be verified. For example, a queue 515 can be sorted such that tapes satisfying the highest priority policy are at the top of the queue, tapes satisfying the next highest priority policy next in the queue and so on. Tapes satisfying multiple policies can be ordered with the highest priority policy that they satisfy.

Dispatcher 510 can be a thread tasked with controlling the scheduling of verification of tapes using particular drives and dispatching these verifications. Dispatcher 510 can be executed in a continuous loop or be initiated and terminated as needed or desired, or at regular intervals (for example, every 30 seconds, 5 minutes, etc.). Dispatcher 510 can be responsible for determining if drives are available for verification and the tapes that are to be verified in the available drive. Dispatcher 510 can provide drive identification (drive serial number, address or other identifier), or tape or volume identification (e.g., tape barcode, location of the tape or other identification) to verifier 530.

Dispatcher 510 can determine if there are any drives available using the state associated with each drive analyzing tape movements through the tracking data associated with, for example, a tape in tape list 532 or drive in drive list 526, or by sending Inquiry commands to the drives designated as verification drives to ensure that they are free. Because not all tape drives can handle all tapes, dispatcher 510 can determine which of the available verification drives are compatible with the tapes in the queue (or otherwise identified) and assign each tape to a compatible verification drive. This can be done for all the tapes or can be done as each tape comes to the top of the queue. Dispatcher 510 can also assign tapes to drives for load balancing or other reasons. If a verification drive is not available to support a particular tape, that tape can be skipped during verification and verified when an appropriate drive becomes available.

Dispatcher 510 can also determine if tapes identified for verification are available by reviewing tape tracking information to determine if a tape is in a drive or import/export slot, sending Read Element Status commands to the media library or otherwise determining the status of each tape identified for verification. According to one embodiment, an unavailable tape can remain in the verification queue until it can be verified. In some embodiments, the location of that tape in the queue could be altered (for example, the tape could be moved to the front of the queue so that it is more likely the tape will be verified when it is available).

Verifier 530 can be used to receive data from, and issue commands to, the library for the verification of a tape, storing results obtained during the verification, deriving verification data from other verification data or determining a result for the verification of a tape. For example, verifier 530 can issue commands to reserve the appropriate drive, move the tape, run the verification, rewind the tape, move the tape back to items original position or other storage slot, release the drive and update tape list 532 or otherwise store verification data or the results of the verification. Verifier 530 can also receive data from library returned, for example, in response to commands that it issued.

Figure 8:
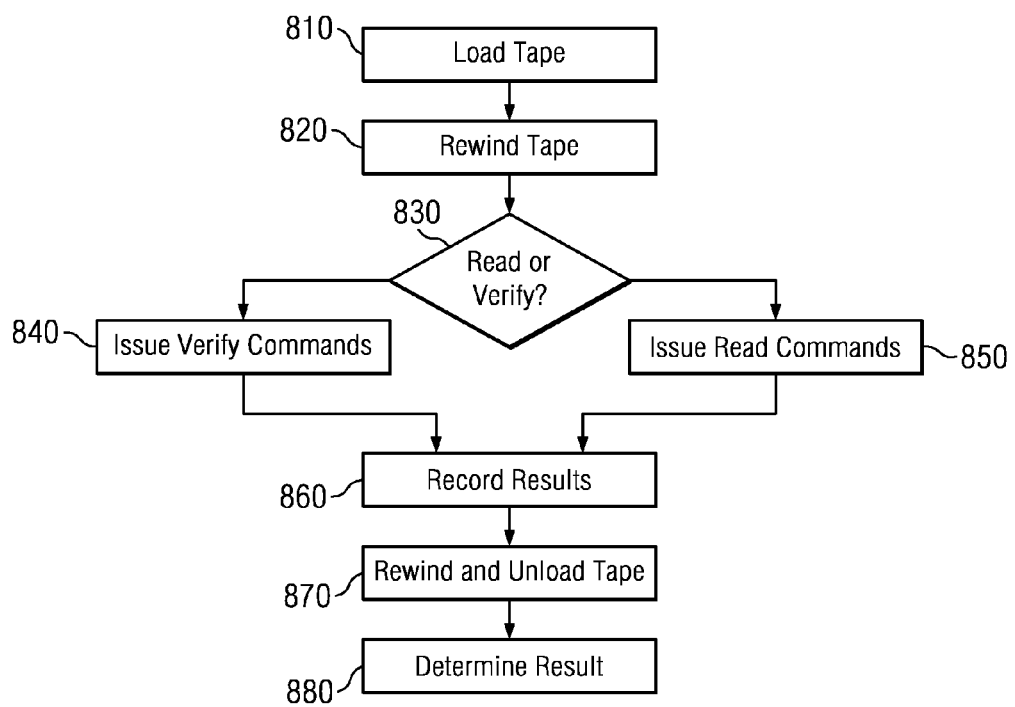
FIG. 8 is a flow diagram illustrating one embodiment of a method for use in performing verification.

Turning now to FIGS. 6-8, embodiments of methods which may be employed by monitoring appliances such as those in FIG. 5 are depicted. Referring first to FIG. 6, one embodiment of a method for identifying tapes to be verified is depicted. At step 610 resources may be scheduled for use in the archive verification process. As the media library may undergo verification as described herein while in regular use (for example, while being used for backup or archiving of data, etc.) it may be desired that the archive verification be assigned a lower priority than the regular operations of the library. Accordingly, it may be desired to schedule such verification operations for off-peak or relatively low use time periods or to dedicate a set of drives for exclusive use by the verification process to allow the remaining drives to continue with the regular operation of the media library. Thus, in some embodiments an administrator may provide a verification window, which may comprise one or more resources (for example, drives) and one or more corresponding time periods for each of those drives. For example, a specific drive of a library may be dedicated to archive verification such that the drive is generally only used for archive verification and is available at all times. In other embodiments, to minimize possible conflicts between archive verification and other operations performed by a library, certain drives may be dedicated to archive verification for periods of time (for example, nightly from 12:00 a.m. to 4:00 a.m.) or a specific drive may be dedicated to archive verification for a two hours on certain days. In a further embodiment, all the drives in a library are dedicated to archive verification during a verification window of a specific time period. For example, the verification window may specify that all the drives in a library may be dedicated to archive verification during a defined time period (for example, every month).

Verification policies may then be defined for use in the archive verification process at step 620. These verification policies define one or more criteria which may be used to identify media which should be subjected to verification. These policies may be based on time periods, types of media (for example, types of tape cartridge), how many times the tape has been loaded or read, how many errors have occurred during regular use of the media, or almost any other criteria or combination of criteria desired. Examples of such verification policies have been previously discussed herein, other examples will also be possible.

These policies can then be prioritized at step 630. The prioritization of policies allows the defined polices to be assigned a priority with respect to the other defined policies such that the policies with higher priorities will be used to identify tapes before policies with lower priorities. In this manner, tapes identified by the higher priority verification policies may be verified before those tapes identified by the lower priority verification policies.

At step 640, then, the policies may be evaluated. The evaluation of these policies may take place according to a defined time period (for example, policies may be evaluated every 30 minutes), may take place at different time intervals or may occur based on some other timing. The evaluation of the policies may occur according to the priority order of the policies, with a higher priority policy being evaluated before a lower priority policy. The actual evaluation of a particular policy may entail using a policy to identify tapes which meet that policy by determining which of the tapes meet the criteria defined by the policy. To make such a determination, data corresponding to each tape in the library may be obtained and evaluated according to the criteria defined by the policy. This data may, for example, reside in a tape list stored at the monitoring appliance and comprising data on tapes in library such as time of last verification, comprises a list of each tape in the library and associated information for the tape, including for example, a type of the tape or a result determined for the tape during the verification process, a last verification date specifying when the last verification was performed on the tape, etc.

Identifying information corresponding to tapes meeting one or more policies may be added to a queue of tapes to be verified at step 650. This queue may be a first in, first out (FIFO) queue, such that, in instances where verification policies are used to identify tapes in order of prioritization, tapes identified by higher priority policies may be queued before tapes identified by lower priority verification policies. At the expiration of the next time period then, the policies may once again be evaluated at step 640. In this manner the queue of tapes to be verified is created or updated substantially every time period.

The tapes in the queue may then be verified. Moving now to FIG. 7, one embodiment of a method for the verification of tapes is depicted. At step 710 it can be determined if any resources, such a one or more drives of the library, are available for use in the verification process. This determination may be made using a list of drives in the library and a verification window which specifies which drives may be used for a verification process and when such drives may be used. Thus, each of the drives may have an associated state based on the verification window and the time. These states may comprise, for example, "NOT AVAILABLE," "AVAILABLE, NOT BEING USED" and "CURRENTLY IN USE FOR VERIFICATION." Thus, by determining the state associated with each drive for example, by accessing the state stored in the drive list in association with the drive, or utilizing the verification window, etc., it can be determined if any drives are currently available for use in verification.

If no drives are currently available for verification, at step 720, the process can be paused for an interval before again attempting to determine if any resources are available at step 710. This interval may be a predetermined interval if the process is a watchdog or daemon process, may be an interval determined based on the verification window or the current time, or may be determined based on some other methodology altogether. For example, if the verification window does not designate that any drive will be available for 4 hours the process may sleep for four hours.

Once a drive is identified as being available for use in verification, a tape to be verified using the drive may be determined at step 730. In one embodiment, the first tape in the queue of tapes to be verified may be selected for verification. However, as mentioned, different types of drives may exist in a library. As different types of drives utilize different types of tapes it may be the case that not all tapes in a library may be verified using the identified drive. Thus, in some embodiments, it can be determined if a selected tape may be verified. This determination can be made by comparing the drive type associated with drive which may be stored in a drive list and the type of the tape which may be stored in association with the tape in the tape list. If the available drive and the selected tape are compatible the tape may be verified in the drive. On the other hand if the drive and tape are not compatible another tape may be selected. The next tape selected will, in most cases, be the next tape in the queue. It can then be determined if this tape is compatible with the available drive and so on until a compatible tape, if one exists, is found in the queue.

Once a tape is selected for verification in the available drive, verification of the tape can be performed in the available drive at step 740. It can also be determined if problems occurred during verification at step 750. More specifically, during verification one or more errors may be issued on certain occurrences, such as if a tape cannot be moved (tape removed before RVA verification), a tape return slot was occupied, tape returned to new slot, a drive is unable to verify due to unrecoverable error, changer failures, etc. If such an error occurs, the tape may be placed back in the queue and no attempt may be made to verify this tape for a certain time period. In one embodiment, exponential backoff may be utilized in the verification for this tape such that each time a problem occurs during verification of this tape the time period between attempts at the verification of this tape may be increased in an exponential manner. In one embodiment, a set of rules may be utilized to determine an action to take based on the error returned from the drive. The verification process may be terminated for a variety of reasons at step 760. The termination may occur an end of tape (EOT) was reached, an external trigger to end the verification process may be provided by the user, the verification window may be close (for example, the verification may go beyond the time period during which the drive being used is designated for verification, an error may occur, or for some other reason. After the termination of the verification of the tape a result to associate with the tape may then be determined at step 770.

FIG. 8 depicts one embodiment of a method for performing such a verification. As discussed above, once it has been determined that a particular tape is to be verified using a particular drive, the actual verification process may occur. To verify a selected tape in a particular drive then, at step 810 a command to load the tape in the drive can be sent to the library. If this load fails a set of rules can be applied to determine an action to take, such as to retry the verification after a certain time period or another action.

If the load command completes without error a command to rewind the tape may then be issued to the drive at step 820. A command to be utilized in the verification process may then be determined at step 830. As discussed above, certain types of drives may not support certain commands. Accordingly, it can be determined what command to use in the verification of a tape based on the drive in which that tape is being verified. More specifically, it can be determined if the drive being utilized support the Verify command. In one embodiment, this determination may be made by attempting to send a Verify command to the drive and determining if any errors indicating an unsupported command are observed. Alternatively, the type of the drive being utilized for verification, which may be stored in association with the drive in a drive list, may be compared against a list of drive types which support the Verify command. Other methods of determining if a drive supports the verify command may also be utilized.

If the drive supports the Verify command, the Verify command may be used to verify the tape by issuing multiple Verify commands to the drive at step 840. Alternatively, if the Verify command is not supported, at step 850, multiple Read commands may be issued to the drive. It will be noted here, that if Read commands are used to verify a tape, data returned in response to the Read command may be disregarded. During and after the verification then, verification data associated with verification process may be obtained and stored (at step 860) in association with the tape (for example, in the tape list). MAM data on the particular cartridge may be collected by sending a Read Attribute command to the drive in which the particular cartridge is located. In response, the drive reads the MAM data from the MAM (which may be, in one embodiment, flash or other memory) on the particular cartridge and the drive returns the MAM data. Additionally, verification data from the drive which read the particular cartridge can be collected by sending one or more Log or a Log Sense command to the drive. In response, the drive returns drive data associated with the particular cartridge. Such data may include read errors (which may include, for example, the number of soft errors logged by the drive or hard errors) associated with a particular tape, utilization and performance data, data regarding the data read from the particular cartridge, detail tables, amount of data read during the verification of the tape, how much compressed data was read during the verification of the tape or other data. It will be noted that such verification data may be stored or consolidated at multiple times during the verification of a tape, for example, after the issuance of each command or after a response is received from the library, etc.

The tape can then be rewound and unloaded at step 870. A result for the verification of the tape can then be determined at step 880 and stored in association with the tape. The determination of a result for a tape may comprise applying one or more rules to the verification data, where the rules apply criteria to the verification data to assign a result. For example, if one or more hard errors have occurred during the verification process for a tape the tape may be associated with a result of FAIL while if no hard errors have occurred the tape may be associated with a result of PASS. Other results and rules will also be possible. For example, the PASS result may be further divided into results of CAUTION, CONCERN or GOOD, based upon the verification data based on an analysis of the verification data, embodiments of which will be discussed in more detail below. A fail result may also have certain subcategories for example, COULDN'T LOAD, COULDN'T READ, etc.

In one embodiment, subcategories of PASS may be determined based on a soft error rate. As discussed above verification data comprising the amount of data read and the number of errors occurring during each of these reads may likewise be obtained. Thus, an error rate comprising the number of errors per gigabyte of tape read may be determined based on the verification data obtained during the verification of that tape. This error rate may be compared to a threshold error rate to determine a subcategory of PASS to associate with a particular tape. This threshold may, for example, be based on the type of the tape and may be associated with the tape itself in a tape list, or otherwise associated with a tape type such that once a type of the tape is determined a threshold for that type of tape may likewise be determined. Using this threshold then a subcategory to associate with the tape can be determined. For example, if the error rate is below the threshold error rate the tape may be assigned a subcategory of GOOD, if the error rate determined for the tape is greater than the threshold but less than twice the threshold the tape may be assigned the subcategory of CAUTION and if the error rate is greater than twice the threshold error rate the tape may be assigned the subcategory of CONCERN.

In the foregoing, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for archive verification, comprising:
a library including a plurality of drives and a plurality of media coupled to a network;
a monitoring appliance coupled to the network and configured to:
  monitor the media library during non-verification operation and store a set of collected data, the set of collected data comprising a first set of error data;
  maintain a set of verification policies;
  evaluate the first set of error data according to the set of verification policies to determine a set of media to be verified;
  perform a verification on at least one of the set of media, where performing the verification comprises:
    determining that a first drive of the library is available;
    verifying a first media of the set of media using the first drive;
    obtaining verification data associated with the verification of the first media in the first drive, the verification data comprising a second set of error data generated by the first drive when executing a verification command to determine the readability of data on the first media by the first drive; and
    determining a result for the verification of the first media based on the verification data.

2. The system of claim 1, wherein the set of verification policies are prioritized.

3. The system of claim 2, wherein the first media is determined based on the first drive.

4. The system of claim 3, wherein the set of media are ordered and a type of the first media is compatible with a type of the first drive.

5. The system of claim 1, wherein the verification of the first media utilizes a VERIFY or a READ command.

6. The system of claim 5, wherein the verification data comprises one or more errors including a hard error or a soft error and the result is a PASS if the one or more errors do not comprise a hard error.

7. The system of claim 6, wherein the verification data is determined utilizing a LOG or LOG SENSE command issued to the first drive.

8. The system of claim 1, further comprising:
a non-transitory memory within the library to store the verification data;
an interface to connect to a first transport medium, wherein the library is connected to the first transport medium.

9. The system of claim 8, wherein the interface comprises a Fibre channel Interface.

10. The system of claim 1, wherein the first drive includes a verification window that is associated with when the first drive is available for to verify the at least one of the plurality of media.

11. The system of claim 1, wherein evaluating the first set of error data according to the set of verification policies to determine the set of media to be verified further comprises:
determining a threshold number of errors specified by a first verification policy;
determining media associated with greater than the threshold number of errors from the from the first set of error data; and
selecting media associated with greater than the threshold number of errors for inclusion in the set of media to be verified.

12. The system of claim 1, wherein the first media stores a set of content and wherein the monitoring appliance is configured to perform the verification of the first media without knowledge of the set of content stored on the first media.

13. A method for performing verification on a plurality of media in a library that includes a plurality of drives and the plurality of media, the method comprising:
at a monitoring appliance coupled to the media library:
monitoring the media library during non-verification operation and storing a set of collected data, the set of collected data comprising a first set of error data;
evaluating the first set of error data according to a set of verification policies to determine a set of media to be verified;
determining that a first drive of the library is available;
verifying a first media of the set of media using the first drive;
obtaining verification data associated with the verification of the first media in the first drive, the verification data comprising a second set of error data generated by the first drive when executing a verification command to determine the readability of data on the first media by the first drive; and
determining a result for the verification of the first media based on the verification data.

14. The method of claim 13, wherein the set of verification policies are prioritized.

15. The method of claim 14, wherein the first media is determined based on the first drive.

16. The method of claim 15, wherein the set of media are ordered and a type of the first media is compatible with a type of the first drive.

17. The method of claim 13, wherein the verification of the first media utilizes a VERIFY or a READ command.

18. The method of claim 17, wherein the verification data comprises one or more errors including a hard error or a soft error and the result is a PASS if the one or more errors do not comprise a hard error.

19. The method of claim 18, wherein the verification data is determined utilizing a LOG or LOG SENSE command issued to the first drive.

20. The method of claim 13, wherein the first drive includes a verification window that is associated with when the first drive is available for to verify the at least one of the plurality of media.

21. The method of claim 13, wherein evaluating the first set of error data according to the set of verification policies to determine the set of media to be verified further comprises:
determining a threshold number of errors specified by a first verification policy;
determining media associated with greater than the threshold number of errors from the collected data; and
selecting media associated with greater than the threshold number of errors for inclusion in the set of media to be verified.

22. The method of claim 13, wherein the first media stores a set of content and wherein the monitoring appliance performs verification without knowledge of the set of content stored on the first media.

23. A non-transitory computer readable medium comprising instructions for:
monitoring the media library during non-verification operation and storing a set of collected data, the set of collected data comprising a first set of error data;
evaluating the set of collected data according to a set of verification policies to determine a set of media to be verified;
determining that a first drive of the library is available;
verifying a first media of the set of media using the first drive;
obtaining verification data associated with the verification of the first media in the first drive, the verification data comprising a second set of error data generated by the first drive when executing a verification command to determine the readability of data on the first media by the first drive; and
determining a result for the verification of the first media based on the verification data.

24. The computer readable medium of claim 23, wherein the set of verification policies are prioritized.

25. The computer readable medium of claim 24, wherein the first media is determined based on the first drive.

26. The computer readable medium of claim 25, wherein the set of media are ordered and a type of the first media is compatible with a type of the first drive.

27. The computer readable medium of claim 23, wherein the verification of the first media utilizes a VERIFY or a READ command.

28. The computer readable medium of claim 27, wherein the verification data comprises one or more errors including a hard error or a soft error and the result is a PASS if the one or more errors do not comprise a hard error.

29. The computer readable medium of claim 28, wherein the verification data is determined utilizing a LOG or LOG SENSE command issued to the first drive.

30. The computer readable medium of claim 23, wherein the first drive includes a verification window that is associated with when the first drive is available to verify the set of media.

31. The computer readable medium of claim 23, wherein evaluating the first set of error data according to the set of verification policies to determine the set of media to be verified further comprises:
- determining a threshold number of errors specified by a first verification policy;
- determining media associated with greater than the threshold number of errors from the collected data; and
- selecting media associated with greater than the threshold number of errors for inclusion in the set of media to be verified.

32. The computer readable medium of claim 23, wherein the first media stores a set of content and wherein verification of the first media is without knowledge of the set of content stored on the first media.

* * * * *